United States Patent
Karakkattillathu Vishnu Namboothiri

(10) Patent No.: US 8,850,452 B2
(45) Date of Patent: Sep. 30, 2014

(54) CORRELATING PARTS OF COMPOSITE TRANSACTIONS INVOLVING ASYNCHRONOUS CALLING MECHANISMS

(75) Inventor: Vishnu Namboothiri Karakkattillathu Vishnu Namboothiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 12/604,737

(22) Filed: Oct. 23, 2009

(65) Prior Publication Data

US 2011/0099561 A1  Apr. 28, 2011

(51) Int. Cl.
- G06F 3/00 (2006.01)
- G06F 9/44 (2006.01)
- G06F 9/455 (2006.01)
- G06F 9/46 (2006.01)
- G06F 13/00 (2006.01)
- G06F 11/34 (2006.01)

(52) U.S. Cl.
CPC ...... *G06F 11/3476* (2013.01); *G06F 2201/865* (2013.01); *G06F 2201/87* (2013.01); *G06F 11/3419* (2013.01)
USPC ........... 719/313; 719/314; 719/317; 719/318; 719/319; 719/320; 718/100; 718/101

(58) Field of Classification Search
None
See application file for complete search history.

(56) References Cited

U.S. PATENT DOCUMENTS

| | | | |
|---|---|---|---|
| 7,051,339 B2 * | 5/2006 | Deverill et al. | 719/328 |
| 7,318,064 B2 | 1/2008 | Patterson | |
| 2004/0123293 A1 * | 6/2004 | Johnson | 718/101 |
| 2006/0023674 A1 * | 2/2006 | Goring et al. | 370/338 |
| 2006/0064483 A1 | 3/2006 | Patel | |
| 2006/0095395 A1 * | 5/2006 | Patterson | 707/1 |
| 2006/0136932 A1 * | 6/2006 | Bose et al. | 719/314 |

OTHER PUBLICATIONS

Application Response Time Measurement (ARM), Issue 4.0, Version 2-C Binding, p. 13, http://www.opengroup.org/onlinepubs/9699959899/toc.pdf.

Open Group Technical Standard, Systems Management: Application Response Measurement (ARM) API, Jul. 1998, 80 pages.

"Application Response Measurement", http:://enwikipedia.org/wiki/Application_Response_Measurement, Page last modified Sep. 24, 2012, 3 pages.

* cited by examiner

*Primary Examiner* — Emerson Puente
*Assistant Examiner* — Jonathan R Labud
(74) *Attorney, Agent, or Firm* — Prentiss Johnson; Edell, Shapiro & Finnan, LLC

(57) ABSTRACT

At least one presently preferred embodiment of the invention broadly contemplates correlating asynchronous transaction parts based on a unique transaction value (e.g. a unique business ID) that all the transaction parts will have access to. This avoids the need for enriching/changing the message body or message header with ARM "correlator" information.

20 Claims, 4 Drawing Sheets

CORRELATING PARTS OF COMPOSITE TRANSACTIONS INVOLVING ASYNCHRONOUS CALLING MECHANISMS

BACKGROUND

The field of the invention is generally asynchronous transactions. "There are several solutions available that measure transaction response times, such as measuring the response time as seen by a client, or measuring how long a method on an application server takes to complete." Application Response Time Measurement (ARM), Issue 4.0, Version 2-C Binding, p. 13, http://www.opengroup.org/onlinepubs/9699959899/toc.pdf (hereinafter "ARM 4.0"). Application Response Measurement (ARM) can be used for this purpose. "ARM provides a facility for correlating transactions within and across systems." Id.

ARM is an Open Group standard for measuring transaction response times. ARM helps in identifying bottlenecks in response times and to find out the component causing the response time issue. Applications are complex in terms of the number of systems and products involved in completing the transaction topology, for example, because of the distributed nature of transactions. Many of the application management vendors rely on ARM API calls emitted by applications to measure transaction response times. If the transaction flows through multiple systems, correlation of different parts of the transaction happens by passing an ARM "correlator" across the network between different parts of the transaction topology.

ARM helps in measuring response time of transactions passing through disparate systems like a web server, J2EE® application server, databases, mainframe systems, etc. ARM manages to correlate different parts of a transaction, happening on different systems/products, by maintaining the parent-child relationship between transactions by passing a token called a "correlator" as it goes through these different systems/products. This concept works fairly well when in synchronous calls between different systems in the transaction topology. J2EE® is a registered trademark of Sun Microsystems, Inc. in the United States, other countries, or both.

BRIEF SUMMARY

At least one presently preferred embodiment of the invention broadly contemplates correlating asynchronous transaction parts based on a unique transaction value (e.g. a unique business ID) that all the transaction parts will have access to. The inventors have recognized that this is advantageous as compared to relying on passing the ARM "correlator" at least in that it avoids the need for enriching/changing the message body or message header with "correlator" information and leaves the business to keep the message information.

In summary, one aspect of the invention provides a computer program product comprising: a computer readable storage medium having computer readable program code embodied therewith, the computer readable program code comprising: computer readable program code configured to correlate parts of composite transactions involving asynchronous calling mechanisms via providing as a metric value a unique transaction identifier, wherein the unique transaction identifier does not require modification of a header or a body of a message.

A further aspect of the invention provides a method comprising: utilizing one or more processors to execute computer readable program code configured to correlate parts of composite transactions involving asynchronous calling mechanisms via providing as a metric value a unique transaction identifier, wherein the unique transaction identifier does not require modification of a header or a body of a message.

A further aspect of the invention provides an apparatus comprising: one or more processors; and a computer readable storage medium having computer readable program code embodied therewith and executable by the one or more processors, the computer readable program code comprising: computer readable program code configured to correlate parts of composite transactions involving asynchronous calling mechanisms via providing as a metric value a unique transaction identifier, wherein the unique transaction identifier does not require modification of a header or a body of a message.

For a better understanding of the aspects of the invention presented herein, together with other and further features and advantages thereof, reference is made to the following description, taken in conjunction with the accompanying drawings, and the scope of the invention will be pointed out in the appended claims.

DETAILED DESCRIPTION

Figure 1:
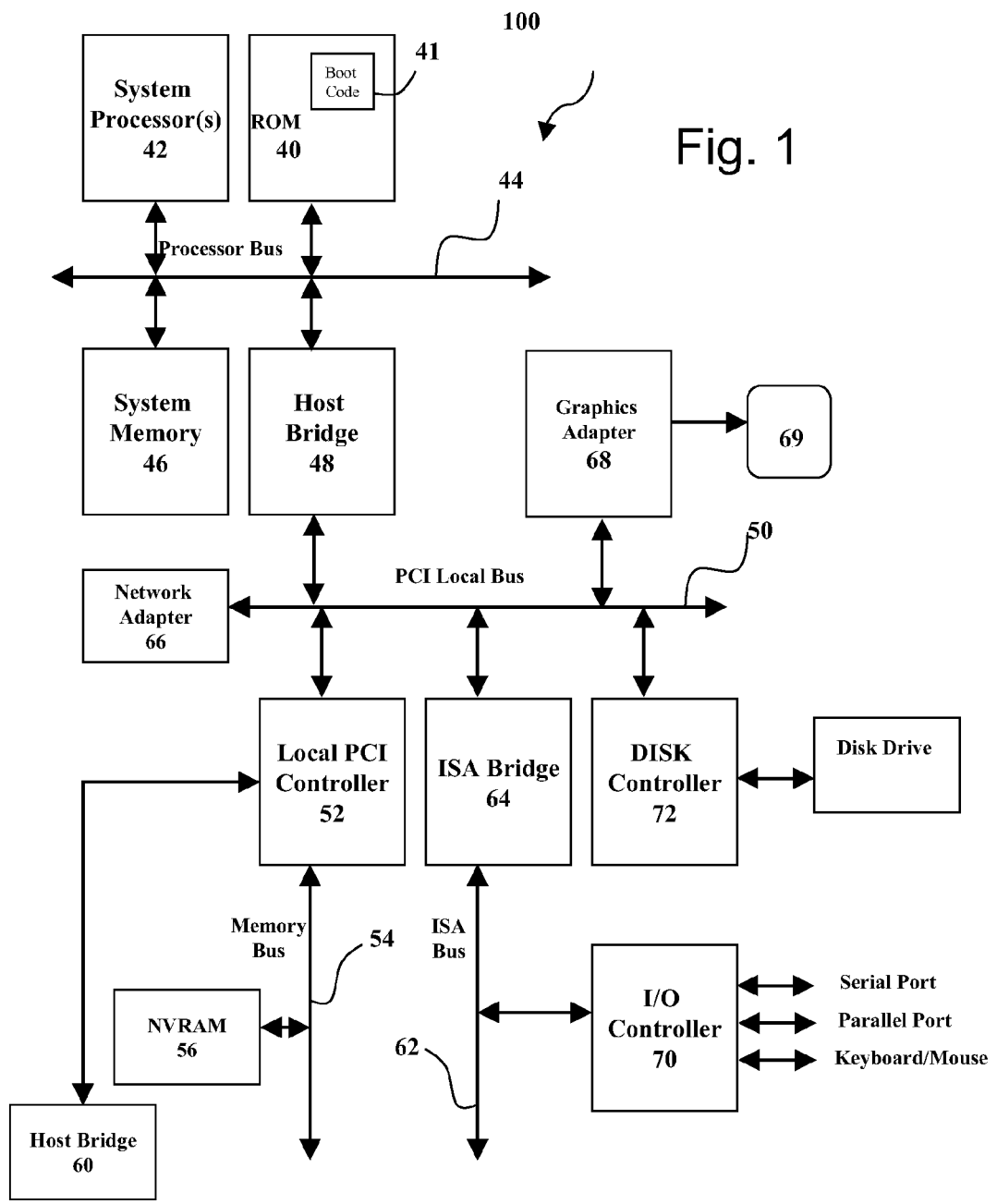
FIG. 1 illustrates a computer system according to one embodiment of the invention.

It will be readily understood that the components of the embodiments of the invention, as generally described and illustrated in the Figures herein, may be arranged and designed in a wide variety of different configurations in addition to the described presently preferred embodiments. Thus, the following more detailed description of the embodiments of the invention, as represented in the Figures, is not intended to limit the scope of the disclosure, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the embodiments of the invention.

The illustrated embodiments of the invention will be best understood by reference to the drawings. The following description is intended only by way of example and simply illustrates certain selected exemplary embodiments of the invention as claimed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

At least one exemplary embodiment of the invention provides systems and methods for correlating asynchronous transaction parts based on a unique transaction value (e.g. a unique business ID) to which all the transaction parts will have access. An embodiment of the invention utilizes this unique transaction identifier in lieu of the ARM "correlator" and thus precludes any need for message modification, as described herein.

Referring now to FIG. 1, there is depicted a block diagram of an illustrative embodiment of a computer system 100. The illustrative embodiment depicted in FIG. 1 may be a notebook computer system or a workstation computer. As is apparent from the description, however, this embodiment is applicable to any data processing system or other electronic device, as described herein.

As shown in FIG. 1, the computer system 100 includes at least one system processor 42, which is coupled to a Read-Only Memory (ROM) 40 and a system memory 46 by a processor bus 44. System processor 42, which may comprise one of the processors produced by Intel Corporation or ARM Ltd., is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN 10, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

The computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keypad, touch pad, and a disk drive. In addition, I/O controller 70 supports external communication by computer system 100 via serial and parallel ports. The USB Bus and USB Controller (not shown) are part of the Local PCI controller (52). The components of the computer system (100) can, in combination with program instructions, execute the functions of the embodiment(s) of the invention as described herein.

As alluded to above, "[i]n ARM[,] each transaction instance is assigned a unique token, named in ARM parlance a "correlator" . . . and management agents and applications that understand it can take advantage of the information in it to determine where and when a transaction executed, which can aid enormously in problem diagnosis."

Figure 2:
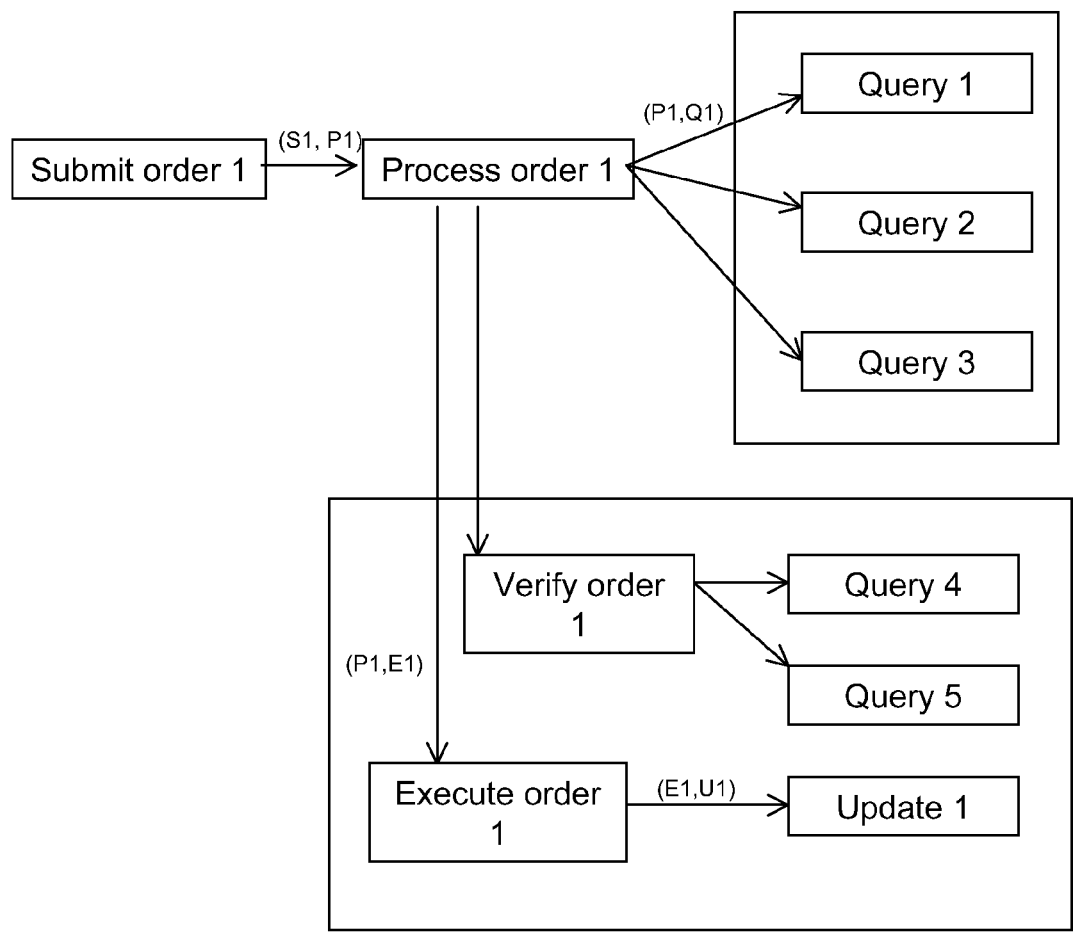
FIG. 2 illustrates a high level view of distributed transactions.

As shown in FIG. 2, a transaction can be characterized as distributed. "To relate the transactions together, the application components are each instrumented with ARM. [E]ach transaction passes the correlator that identifies itself to its children." ARM 4.0 at p. 15. "[T]he Submit Order transaction passes its correlator (S1) to its child, Process Order. Process Order passes its correlator (P1) to its [ ] children . . . queries, Verify Order, and Execute Order. Verify Order passes its correlator [ ] to its [ ] children, and Execute Order passes its correlator (E1) to its [ ] children." ARM 4.0 at p. 15.

"The last piece in the puzzle is that each of the transactions instrumented with ARM passes its parent correlator to the ARM library. The ARM library knows the correlator of the current transaction. The correlators can be combined into a tuple of (parent correlator, correlator). Some of the tuples in [FIG. 1] are (S1, P1), (P1,Q1), (P1, E1), and (E1, U1). By putting the different tuples together, the management application can create the full calling hierarchy using the correlators to identify the transaction instances . . . " ARM 4.0 at p. 15. "As an example of how this information could be used, if S1 failed, it would now be possible to determine that it failed because P1 failed, P1 failed because V1 failed, [etc.]." ARM 4.0 at p. 15.

Figure 3:
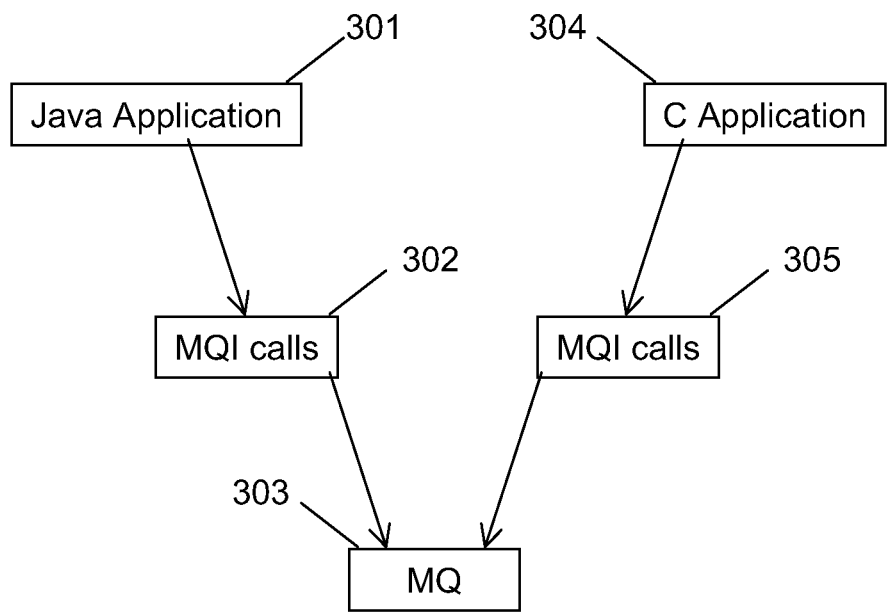
FIG. 3 illustrates two applications in an asynchronous transaction.

As illustrated in FIG. 3, at least one presently preferred embodiment contemplates as a main area of interest a context where asynchronous calls happen between different parts of the transaction. For example, consider one Java® application (301) putting a message (via MQI calls (302)) into a queue (say for example MQ series queue (303)), and let us say a C application type (304) processes it by getting (via MQI calls (305)) the message from the queue (303) some time later, as follows:

Java® application→MQI calls→MQ←F MQI call←C application

Java® and all Java-based trademarks and logos are trademarks of Sun Microsystems, Inc. in the United States, other countries, or both. The inventors have recognized that in such a case the conventional ARM techniques fail to correlate the different parts of the transaction and thus maintain the parent-child relationship between these two parts of the transaction. The only way of making conventional ARM techniques correlate such transaction parts would be to enrich the message body or message header with the ARM "correlator" from the parent and making the child program process the "correlator" from the message. Unfortunately, this is an unacceptable approach in many instances, as it is often tedious for organizations having concerns regarding changing the message put into the queue.

Accordingly, at least one exemplary embodiment of the invention does not require that the message body or message header be changed or modified for getting the transaction parent-child relationship. A exemplary embodiment operates on the assumption that in most, if not all business transactions, there is some kind of unique business related identifier, for example a business ID such as a user ID, an account ID, a transaction ID, etc. This unique business related identifier is unique for a particular transaction (at least for a predetermined period of time) and traverses from the beginning to the end of the transaction.

Thus, at least one exemplary embodiment of the invention correlates the transaction parts based on the value of this unique business related identifier which all transaction parts will have access to, instead of relying on passing the ARM "correlator". At least one exemplary embodiment of the invention avoids the need for enriching/modifying/changing the message body or message header with "correlator" information by instead passing the unique business related identifier as a metric. This leaves the business free to keep the message information as before (i.e. unmodified). This should please customers/businesses who are unwilling to change the message header or message body but still want to correlate the different parts of the asynchronous transactions using a metric value (which can be accomplished using for example a unique business ID as described herein). This is a completely different approach from a conventional ARM standard since the approach according to at least one presently preferred embodiment of the invention uses the metric values (e.g. unique business ID) to correlate different parts of the transaction rather than an ARM "correlator".

Figure 4:
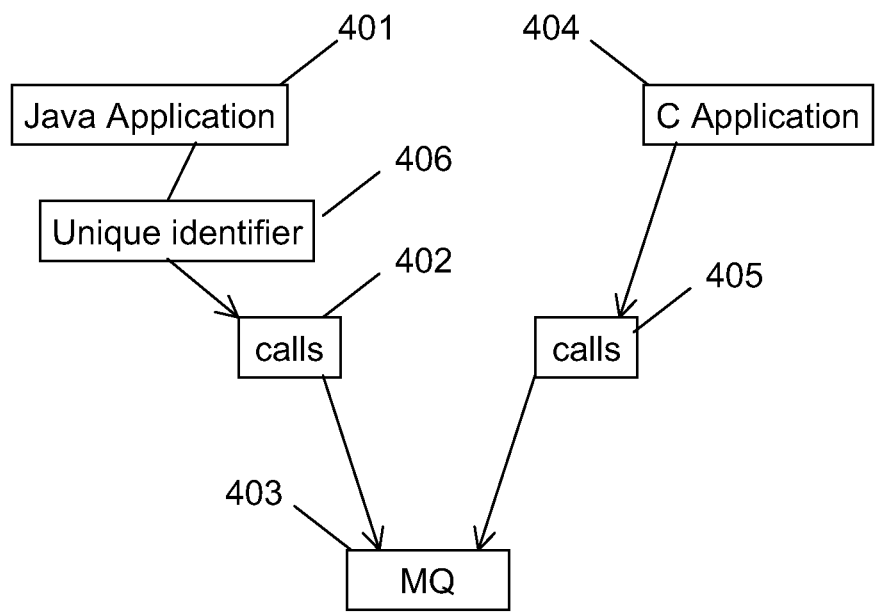
FIG. 4 illustrates two applications in an asynchronous transaction using a unique identifier according to one embodiment of the invention.

Referring now to FIG. 4, when a first application (401) makes MQI calls (402) to put the message in the queue (403), the first application (401) can pass a few metric values apart from normal start and stop times. At least one exemplary embodiment of the invention provides as a metric value a unique identifier (406) (e.g. a customerID, an accountID, etc). This will be stored along with transaction times by system management products (e.g. IBM® Tivoli® Composite Application Manager (ITCAM) for Response Time Tracking (or any other system management product which can listen to ARM calls)). The message is put into queue (403) by the first application (401), and a second application (404) processes it. Notably, the ARM "correlator" is not passed, so no change in message header/body is required. IBM® and Tivoli® are registered trademarks of International Business Machines Corporation in the United States, other countries, or both.

In this non-limiting example, a first application (e.g. Java® application 401) starts. The first application (401) does a set of ARM API calls to initialize work, for example registering the metric values to be passed to ARM libraries. In this example, a metric value contains the unique identifier (406), such as a unique business transaction ID. The first application (401) calls arm_start_transaction( ) ARM API, which indicates to the system management product that it needs to start measuring the transaction time. The first application (401) makes the MQI call to put the message into the queue. The first application (401) then makes arm_end_transaction.

The second application (404) (e.g. C application in this example) does a set of ARM API calls to initialize work (e.g. registering the metric values to be passed to ARM libraries (in this example including the unique identifier (406)). The second application (404) calls arm_start_transaction( ) ARM API (again indicating to the system management product that transaction time measurement is needed). The second application (404) gets the unique identifier (406) from the message it got from the queue (403) and initializes the variable (unique identifier (406)). The second application (404) then makes the MQI call to get the message into the queue (403). The second application (404) then makes arm_end_transaction.

The second application (404), when it makes MQI calls (405) to get the message from the queue (403) (and makes ARM API calls, e.g. arm_start_transaction calls, as well), since there is no "correlator" existing, a new "correlator" will be created. This will be treated as a new transaction with no parent relationship to the first transaction from the perspective of various system management products. A presently preferred embodiment of the invention will make the second application (404) pass the ARM metrics, which will again have the unique identifier (406) that was part of the message. Recall that this unique identifier (406) was passed as a metric by the first application as well to the system management product of choice.

Thus, according to at least one embodiment of the invention, even though the "correlator" is different for the two parts of the transaction, an embodiment of the invention provides a metric (i.e. the unique identifier) that is stored in the system management products' backend repository. Accordingly, at least one embodiment of the present invention provides a utility that will correlate the transaction parts based on this metric (i.e. the unique identifier) rather than on the ARM "correlator". Thus, the transactions can use arm_register_metric function (in case of C/C++) (or the methods in the class ArmMetricFactory in case of Java®) to actually pass the metric (i.e., the unique identifier (406) to the system management products. Another specific example is provided in the Appendix.

As above, at least one embodiment of the invention operates on the assumption that a unique identifier (e.g., business ID) exists and is unique (or at least unique during the same time period, as illustrated by the example of UNIX® PIDs which can be reused but are still unique at a given point in time). It is also assumed that the unique identifier is passed as part of the message in the asynchronous call. UNIX® is a registered trademark of The Open Group in the United States and other countries.

In brief recapitulation, at least one embodiment of the invention removes the need for modifying the header and/or message to keep parent-child relationships in an asynchronous message, as forced by current ARM standards, via use of a unique identifier, such as a unique business ID.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

APPENDIX

Flow of program 1 which puts message to the queue:
    Make the following ARM calls from the first program which puts messages into a queue.
        Call arm_register_application( )
        Call arm_register_transaction( )
        Call arm_register_metric( ) for the metric measured (the unique business ID in our case), and bind it to appropriate arm_sdk buffers
        Call arm_start_transaction( )
        Initialize the buffers associated with the metric registered above with the unique business ID mentioned in the disclosure
        Do the actual processing like Put_Message_to_Queue( ), which writes messages to queue
        Call arm_stop_transaction( )
        Call arm_stop_application( )
        Call arm_destroy_application( )
Flow of program 2 which reads message from the queue:
    Make the following ARM calls from the second program which reads messages from the queue.
        Call arm_register_application( )
        Call arm_register_transaction( )
        Call arm_register_metric( ) for the metric measured (the unique business ID in our case), and bind it to appropriate arm_sdk buffers
        Call arm_start_transaction( )
        Do the actual processing like Get_Message_to_Queue( ), which reads the message from queue
        Extract the unique Business ID from the message (this any way will be done by any meaningful application interacting with the queue)
        Initialize the buffer associated with the metric with the extracted Business ID from above step
        Call arm_stop_transaction( )
        Call arm_stop_application( )
        Call arm_destroy_application( )
Flow inside a System management product handling ARM calls:
    It is presently preferred that there will be two threads, one doing the processing as done today by any system/application management product, and a second thread will do the specific processing as described herein.
Thread 1:
    Carry out normal ARM processing as dictated by the ARM standard and store transaction start & stop times along with associated metric (unique business ID) in a metadata database.

Thread 2:
Do the following processing:
  Read the metadata database, and find out the list of transactions having same metric value (unique business ID)
  For any such list, look at the start timestamp for each of those transactions, and order them in ascending order of start timestamp. This will be the order of call topology of sub-transactions for the entire transaction.
  For example, since the Business ID is preferably unique during a certain chosen time period, it won't be repeating until the final sub-transaction finishes processing. Due to this fact the timestamps are a reliable ordering mechanism.
  Now do the reporting of the response time of transactions and sub-transactions within the main transactions as any system management product would do it today.

What is claimed is:

1. A computer program product comprising:
  a computer readable hardware storage medium having computer readable program code embodied therewith, the computer readable program code comprising:
    computer readable program code configured to register and provide a unique transaction identifier as an metric value of a system management utility that monitors and generates one or more metrics from performance of a composite transaction for storage in a repository, wherein the unique transaction identifier is common to each of a plurality of different parts of the composite transaction and at least two different parts of the composite transaction are asynchronous; and
    computer readable program code configured to correlate the different parts of the composite transaction within the repository based on the common unique transaction identifier.

2. The computer program product according to claim 1, wherein the unique transaction identifier comprises a unique business identification.

3. The computer program product according to claim 2, wherein the computer readable program code further comprises:
  computer readable program code configured to provide a utility configured to correlate the composite transaction parts based on the unique business identification.

4. The computer program product according to claim 2, wherein the unique business identification is unique for a predetermined period of time.

5. The computer program product according to claim 2, wherein the computer readable program code further comprises:
  computer readable program code configured to pass the unique business identification as part of a message in an asynchronous call.

6. The computer program product according to claim 1, wherein the computer readable program code further comprises:
  computer readable program code configured to accept a part of an asynchronous message from a first application type, the part of the asynchronous message from a first application type comprising the unique transaction identifier,
  wherein the unique transaction identifier determines transactional relationships between one or more parts of the asynchronous message without necessitating modification of a header or a body of the asynchronous message.

7. The computer program product according to claim 6, wherein the computer readable program code further comprises:
  computer readable program code configured to accept a part of an asynchronous message from a second application type, the part of the asynchronous message from a second application type comprising the unique transaction identifier,
  wherein the unique transaction identifier determines transactional relationships between one or more parts of the asynchronous message without necessitating modification of a header or a body of the asynchronous message.

8. The computer program product according to claim 7, wherein the computer readable program code further comprises:
  computer readable program code configured to store the unique transaction identifier.

9. A method comprising:
  registering and providing, via a processor, a unique transaction identifier as a metric value of a system management utility that monitors and generates one or more metrics from performance of a composite transaction for storage in a repository, wherein the unique transaction identifier is common to each of a plurality of different parts of the composite transaction and at least two different parts of the composite transaction are asynchronous; and
  correlating, via, the processor, the different parts of the composite transaction within the repository based on the common unique transaction identifier.

10. The method according to claim 9, wherein the unique transaction identifier comprises a unique business identification.

11. The method according to claim 10, further comprising:
  providing a utility configured to correlate transaction parts based on the unique business identification.

12. The method according to claim 10, wherein the unique business identification is unique for a predetermined period of time.

13. The method according to claim 10, further comprising:
  passing the unique business identification as part of a message in an asynchronous call.

14. The method according to claim 9, further comprising:
  accepting a part of an asynchronous message from a first application type, the part of the asynchronous message from a first application type comprising the unique transaction identifier;
  wherein the unique transaction identifier determines transactional relationships between one or more parts of the asynchronous message without necessitating modification of a header or a body of the asynchronous message.

15. The method according to claim 14, further comprising:
  accepting a part of an asynchronous message from a second application type, the part of the asynchronous message from a second application type comprising the unique transaction identifier;
  wherein the unique transaction identifier determines transactional relationships between one or more parts of the asynchronous message without necessitating modification of a header or a body of the asynchronous message.

16. The method according to claim 15, further comprising:
  storing the unique transaction identifier.

17. An apparatus comprising:
  one or more processors; and
  a computer readable storage medium having computer readable program code embodied therewith and executable by the one or more processors, the computer readable program code comprising:
    computer readable program code configured to register and provide a unique transaction identifier as a metric value of a system management utility that monitors and generate one or more metrics from performance of a composite transaction for storage in a repository, wherein the unique transaction identifier is common to each of a plurality of different parts of the composite transaction and at least two different parts of the composite transaction are asynchronous; and computer readable program code configured to correlate the different parts of the composite transaction within the repository based on the common unique transaction identifier.

18. The apparatus according to claim 17, wherein the unique transaction identifier comprises a unique business identification.

19. The apparatus according to claim 18, wherein the computer readable program code further comprises:

computer readable program code configured to pass the unique business identification as part of a message in an asynchronous call.

20. The apparatus according to claim 18, wherein the unique business identification is unique for a predetermined period of time.

\* \* \* \* \*